United States Patent [19]
Silver et al.

[11] Patent Number: 6,002,793
[45] Date of Patent: *Dec. 14, 1999

[54] MACHINE VISION METHOD AND APPARATUS FOR FINDING AN OBJECT ORIENTATION ANGLE OF A RECTILINEAR OBJECT

[75] Inventors: William M. Silver, Medfield; Nigel J. Foster, Brookline; Cyril C. Marrion, Jr., Acton, all of Mass.

[73] Assignee: Cognex Corporation, Natick, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/330,223

[22] Filed: Oct. 26, 1994

Related U.S. Application Data

[63] Continuation of application No. 07/979,848, Nov. 23, 1992, abandoned, which is a continuation-in-part of application No. 07/828,241, Jan. 30, 1992, abandoned.

[51] Int. Cl.$^6$ .................................................. G06K 9/00
[52] U.S. Cl. ......................... 382/152; 382/197; 382/168
[58] Field of Search ................... 382/168, 171, 382/190, 194, 199, 197, 282, 296, 297, 151, 289, 290, 170, 152; 364/551.02

[56] References Cited

U.S. PATENT DOCUMENTS

| | | | |
|---|---|---|---|
| 3,936,800 | 2/1976 | Ejiri et al. | 382/18 |
| 3,968,475 | 7/1976 | McMahon | 382/18 |
| 4,200,861 | 4/1980 | Hubach et al. | 382/8 |
| 4,254,400 | 3/1981 | Yoda et al. | 382/18 |
| 4,441,206 | 4/1984 | Kuniyoshi et al. | 382/8 |
| 4,630,306 | 12/1986 | West et al. | 382/21 |
| 4,736,437 | 4/1988 | Sacks et al. | 382/44 |
| 4,783,828 | 11/1988 | Sadjadi | 382/22 |
| 4,876,728 | 10/1989 | Roth | 382/8 |
| 4,907,169 | 3/1990 | Lovoi | 382/8 |
| 4,922,543 | 5/1990 | Ahlbom et al. | 382/48 |
| 4,926,492 | 5/1990 | Tanaka et al. | 382/18 |
| 4,955,062 | 9/1990 | Terui | 382/8 |
| 4,959,898 | 10/1990 | Landman et al. | 29/705 |
| 4,972,359 | 11/1990 | Silver et al. | 364/559 |
| 5,054,098 | 10/1991 | Lee | 382/46 |
| 5,073,958 | 12/1991 | Imme | 382/22 |
| 5,081,656 | 1/1992 | Baker et al. | 382/8 |
| 5,091,861 | 2/1992 | Geller et al. | 364/474.34 |
| 5,113,565 | 5/1992 | Cipolla et al. | 382/8 |
| 5,133,022 | 7/1992 | Weideman et al. | 382/8 |
| 5,134,575 | 7/1992 | Takagi | 364/559 |
| 5,265,173 | 11/1993 | Griffin et al. | 382/22 |

*Primary Examiner*—Yon J. Couso
*Attorney, Agent, or Firm*—David J. Powsner; Russ Weinzimmer

[57] ABSTRACT

A machine vision system for finding an angle object orientation, or other characteristic, of an object in an image. The system determines the boundary pixels, determines the segment orientation angles associated with each successive segment of n boundary pixels, assigns a weight to each angle, generates a histogram of the angles according to their weights, normalizes the histogram to an angle range covering 90°, and generates a signal representing the angle corresponding to a selected peak in the histogram. In one embodiment, the system interpolates between neighboring pixels across the boundary to obtain a grey-scale boundary of sub-pixel accuracy.

28 Claims, 6 Drawing Sheets

MACHINE VISION METHOD AND APPARATUS FOR FINDING AN OBJECT ORIENTATION ANGLE OF A RECTILINEAR OBJECT

This application is a continuation of U.S. patent application Ser. No. 07/979,848, filed Nov. 23, 1992, now abandoned the contents of which are hereby expressly incorporated, which application is a continuation-in-part of Ser. No. 07/828,241, filed Jan. 30, 1992 now abandoned.

FIELD OF THE INVENTION

This invention relates generally to machine vision image analysis, and particularly to apparatus and methods for determining a characteristic, such as the angle, of an object image.

BACKGROUND OF THE INVENTION

Machine vision technologies rely upon image processing and image analysis systems. Image processing systems manipulate raw video images through such processes as filtering, subtraction, and rotation, to generate other, enhanced images as output. Image analysis systems extract information from raw or processed video images to generate information or make decisions regarding the images.

This invention is in the field of image analysis.

The concern of the invention is determining characteristics of an object image, e.g., determining the angle of a rectilinear object image.

One prior art approach to determining the angle of an object is so-called "blob" analysis. This approach determines the angle of the principal axis of an image, among other things. This approach is ineffective for square objects because they have no principal axis. Furthermore, if there are perturbations in the outline of an object, such as a portion of a nozzle holding the object of interest showing beyond the periphery of the object, an erroneous result can likely occur.

Sometimes, the object of interest and the background can be distinguished easily, as by strong backlighting illumination, establishing a strong boundary. In other cases, methods known to those skilled in the art can be used to distinguish objects and background. It would be desirable to have a system to take advantage of such aspects of the image to produce a fast determination of the angle of the object. It is an object of the invention to produce a method and an apparatus for making such a determination.

SUMMARY OF THE INVENTION

The invention provides a method and apparatus for finding a characteristic of an object in an image data analysis system.

The method includes generating boundary signals representative of coordinates of the boundary of an object; generating, from the boundary signals, characteristic signals representing the characteristic of successive segments of n points along the boundary (where n is an integer); generating a histogram of those characteristics in accordance with the value of the characteristics; and generating a signal representative of features of the histogram to provide a characteristic of the object.

For rectilinear objects, the characteristic is preferably the angle of orientation of the object. In such an instance, the method involves generating a signal representative of an angle corresponding to at least one selected peak in the histogram to provide that angle.

In one embodiment of the invention, the method includes generating signals representative of the weight to be accorded each angle. During generation of the histogram, each angle is added with its corresponding weight. The method may use a look-up table for determining angles and weights for segments. In a related aspect of the invention, the weight is either 0 or 1.

In another aspect of the invention, the method further includes generating signals representative of sub-pixel boundary points that are interpolated from the coordinates of pairs of pixels across the boundary of the object. The boundary is determined by calculating the difference between the coordinate at the head of the segment and the coordinate at the tail of the segment.

Finally, the method of the invention may include smoothing and peaking enhancing the histogram with a triangle or other peaked mask. It may also include comparing the peak of the histogram to the next highest peak at least a predetermined distance away and generating an error signal if the next highest peak is not significantly less than the highest peak.

Apparatus incorporating the invention includes a boundary tracking means and a characteristic finding means. The boundary tracking means generates signals representative of coordinates of the boundary of the object. The characteristic finding means includes segment means for generating signals representative of characteristics of successive segments of n points along the boundary, histogram means for generating a histogram of the characteristics in accordance with the value of the characteristics, and characteristic-reporting means for generating a signal representative of features of the histogram to provide the characteristic of the object. When the object is a rectilinear one, the apparatus characteristic reporting means generates a signal representative of an angle corresponding to at least one selected peak in the histogram to provide the angle of the object.

According to aspects of the invention, the angle finding means includes angle weight means for generating signals representative of a weight to be accorded each angle, a look-up table provides the weight and the angle for successive segments of boundary points, and the weight is set at 0 or 1. The histogram means includes means for adding each angle to the histogram according to its weight. The apparatus can include normalizing means for normalizing the angle of each segment whereby each angle is within a range covering 90°. A triangle mask filter can also be provided for generating a smoothed peak enhanced histogram, while comparison means can compare the highest peak of the histogram to the next highest peak to signal an error if those peaks do not differ significantly.

In other aspects of the invention, the boundary tracking means includes interpolating means for generating boundary coordinates from coordinates of pairs of pixels on opposite sides of the boundary of the object. Here, the angles for segments along the boundary are determined as the difference in x and y coordinates between the coordinate at the head of the segment and the coordinate at the tail of the segment.

BRIEF DESCRIPTION OF THE DRAWINGS

Other objects, features and advantages of the invention will be described, or be inherent in, the following description of a preferred embodiment of the invention, including the drawings thereof, in which.

DESCRIPTION OF A PREFERRED EMBODIMENT

Figure 1:
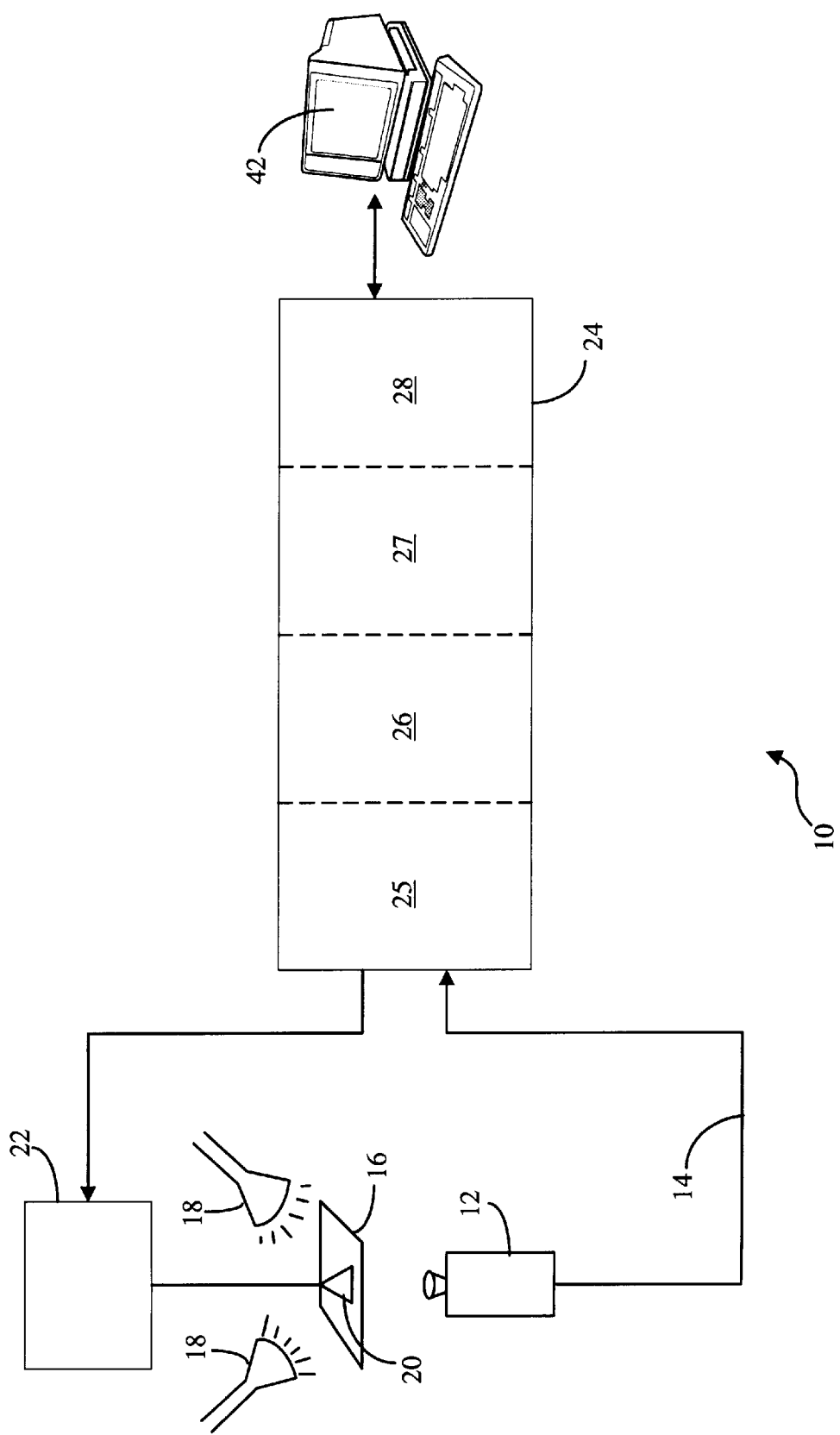
FIG. 1 is a schematic representation of a machine vision apparatus of the type with which the invention may be used.

FIG. 1 is a schematic representation of a machine vision system 10 for inspecting devices by image processing and analysis. The system 10 includes a video camera 12 for generating a video signal 14 representing an object 16 being inspected. Lighting sources 18 provide illumination, e.g., that backlights the object 16. A pickup nozzle 20 holds the object 16 during inspection. Servo 22 moves the nozzle 20 and, thereby, the object 16.

The machine vision system 10 further includes an image analyzer 24 for performing an automatic vision analysis of the object 16. The image analyzer 24 determines characteristics of the object 16, such as position, boundary and angle, based on processing and analyzing the video image signal 14 from the video camera 12.

In a preferred embodiment of the invention, image analyzer 24 represents a conventional digital data processing system including an image digitizer 25, random access memory 26, CPU 27, and input/output processor 28 connecting the system 24 to peripheral devices such as a monitor 42.

The image analyzer 24 includes a blob analyzer 30, a boundary tracker 32 and an angle finder 34. These elements of the system for determining the boundary and angle of an object 16 are preferably carried out under software control as described in detail below. However, those skilled in the art will appreciate that the image analyzer 24 may be implemented on a special purpose device constructed in accordance with the teachings herein.

The image digitizer 25 converts, in a conventional way well known to those skilled in the art, the video image signal 14 into a digital representation 44 of the image seen by the camera 12. The digital image 44 consists, in the conventional manner, of individual pixels, of various light intensities, having x and y integer coordinates. The pixels represent the elements of the video image, including the object image and background. The memory 26 can be used, for example, to store the digital image 44 for analysis by the other components.

The conditions under which the system 10 of the invention is preferably used are as follows. The digital image 44 is essentially binary. That is, the object of interest has a consistent intensity level that is substantially different from the background's consistent intensity level. Also, the object of interest has an intensity level less than the background intensity level. Finally, the object of interest falls within a single field of view of the camera 12. It will be appreciated that other conditions permitting use of the system may occur, and that the use of the system is not limited to the conditions described.

Figure 2:
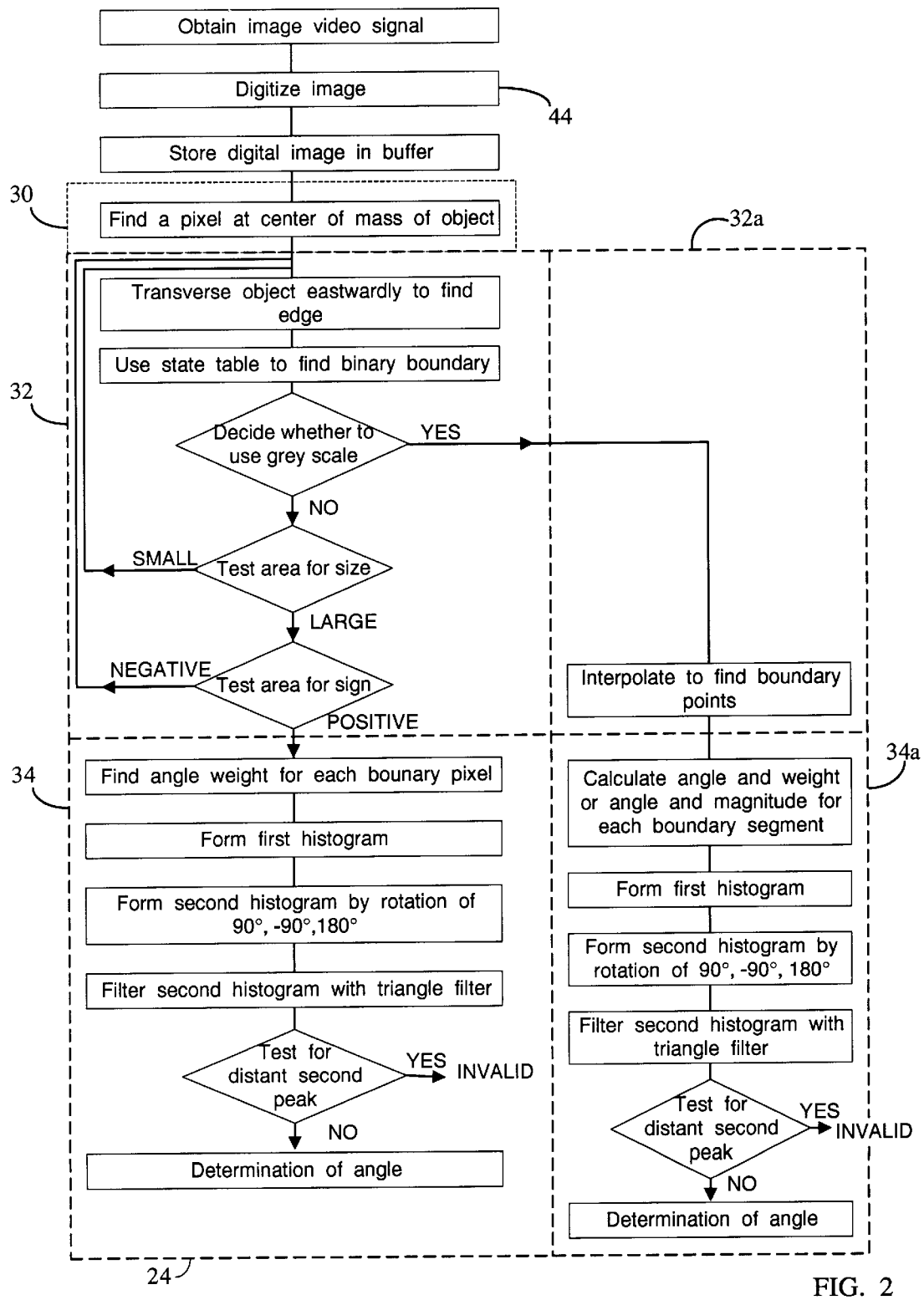
FIG. 2 is a block diagram of a preferred image analyzer according to the invention for use in the machine vision apparatus.

Referring to FIG. 2, once a digitized image of the object has been generated and stored, for example, in memory, in step 30, the image analyzer 24 first attempts to find a pixel within the object 16. The blob analyzer 30 uses conventional techniques to find the center of mass of the object. Assuming that the object 16 is solid, the pixel at the center of mass should be on the object. If the object 16 has a central void, however, the center of mass may not be on the object. This possibility is handled by a technique described below.

In step sequence 32, the image analyzer 24 then finds a pixel on the edge of the object 16 by starting with the pixel at the center of mass, and traversing the object image in a specified direction, such as "east," until a transition from object to background is determined. The transition is determined by locating a pixel with a brightness intensity above a certain threshold value. That threshold value, T, can be determined, for example, by calculating an intensity level midway between the intensity of the object 16 in the image and the intensity of the background in the image. A pixel whose intensity is greater than or equal to T is considered to be outside the object.

Step sequence 32, which represents the operation of a boundary tracker 32, then determines the binary boundary of the object 16. The binary boundary is a list of boundary pixels completely encircling the object of interest. A boundary pixel is a pixel with an intensity level greater than or equal to the threshold that is immediately outside the object of interest. The boundary pixels have integer coordinates. Binary boundaries encircle an object in a counter-clockwise direction.

Figure 3:
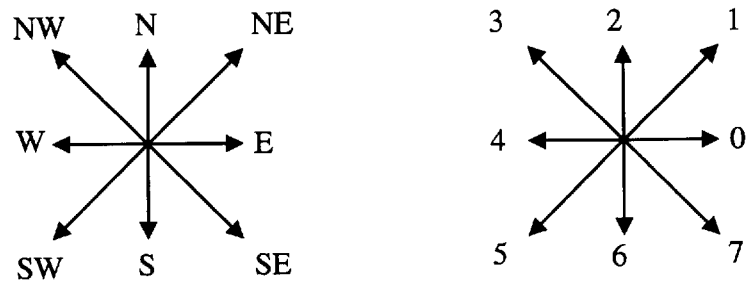
FIG. 3 is a representation of a pixel and its neighbors.

Boundary pixels are eight-way connected. This means a boundary pixel has eight neighbors and there are eight possible directions from one boundary pixel to the next. Neighbors and directions are described with the numbers zero through seven or they are described with compass points: East, North-east, North, North-west, West, South-west, South, and South-east (see FIG. 3).

Starting with the pixel at the transition from object to background, the boundary tracker sequence 32 determines the binary boundary of the object 16, using a procedure well-known to those skilled in the art, such as using the state table set out below, written in the C programming language.

STATE TABLE

```
do
¢   /*  NW  */  state (-rad - 1,  3, area -=  --y + 1,  goto SW)
    /*  N   */  state (-rad,      2,           --y,     continue)
        NE:     state (-rad + 1,  1, area +=  --y,     continue)
    /*  E   */  state (      1,   0, area +=  --y      goto NE)
        SE:     state ( rad + 1,  7, area +=  ++y,    goto NE)
    /*  S   */  state ( rad,      6,           ++y     goto SE)
        SW:     state ( rad - 1,  5, area -=  ++y + 1, goto SE)
    /*  W   */  state (      - 1, 4, area -=   y + 1,  goto SW)
/
while (p != stop);
```

Each state in the table causes the boundary tracker 32 to attempt to move in a specific compass direction. To guarantee that the process terminates, this must begin in the North-west (NW) state. Also, as movement about the boundary proceeds, the area is integrated by well known means to ensure that an outside boundary (rather than an inside boundary, such as that surrounding a hole) is being traversed, as further described below.

The first argument of each entry in the state table indicates how to update the image address to move in that direction.

The second is the direction code for table look-ups. The third indicates how to integrate area. The fourth tells what state to enter after successfully moving in the indicated direction. A move is considered successful if the "new" pixel is background.

If a state is entered, but the object blocks movement in that direction, the boundary tracker sequence 32 attempts to move in the direction indicated by the subsequent entry in the table.

The boundary tracker sequence 32 ends when it returns to the initial transition pixel in the starting state. If the integrated area is then negative, the process transversed a hole or void in the object. Or, if the area is too small, the process is assumed to have traversed noise. In either of these cases, the boundary tracker sequence 32 returns to the transition pixel, moves further east to seek the next edge between object and background, and then moves around the boundary starting with the pixel at that point.

The result of the boundary tracker procedure is the accumulation of the positions of the boundary pixels 46.

Figure 4:
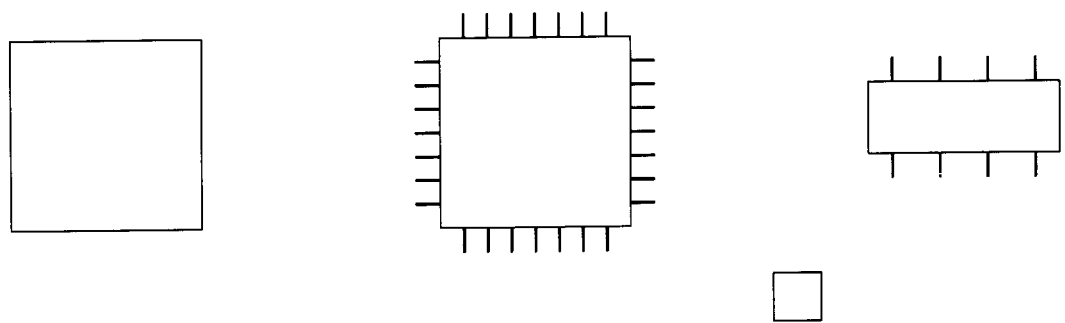
FIG. 4 is a representation of some of the kinds of objects that the embodiment can process.

The image analyzer 24 of the preferred embodiment utilizes an angle finder 34 to execute a sequence of steps that takes the output boundary pixels 46 of the boundary tracker 36 and determines from them the angle of the object 16; see, e.g., rectilinear objects illustrated in FIG. 4.

Particularly, the angle finder sequence 34 determines the angles (or the equivalent slopes) corresponding to successive segments of the boundary pixels 46. Each segment, or group of pixel coordinates, is some fixed number, n, of adjoining boundary pixels 46. Preferably, n is 5 or 6.

Figure 5:
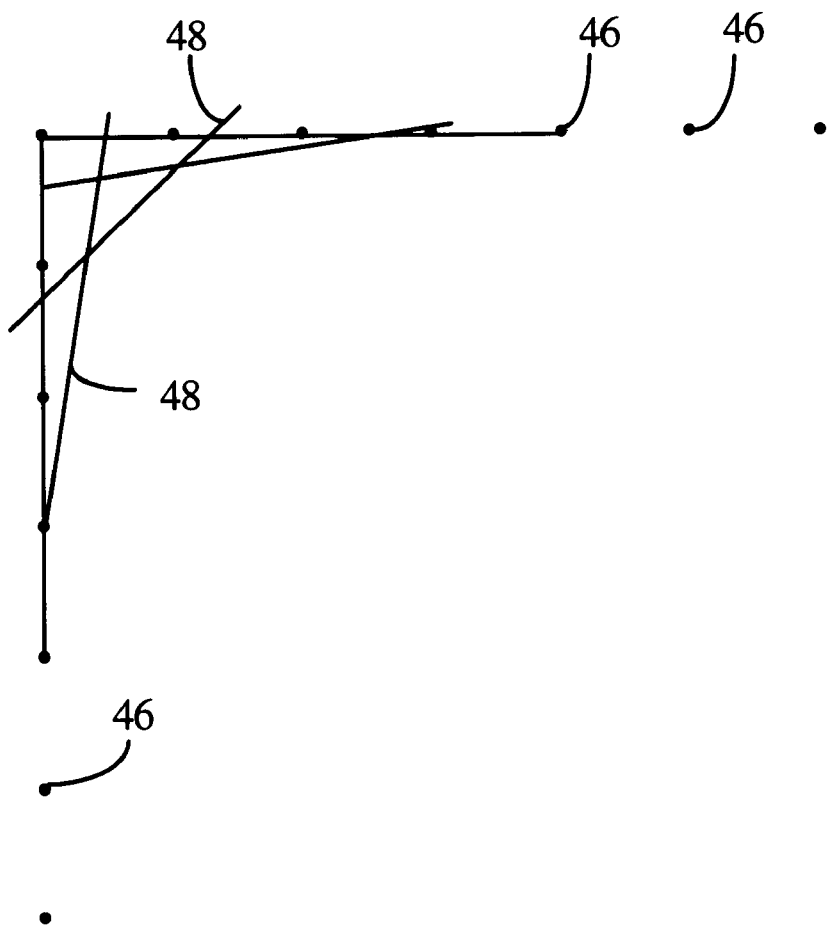
FIG. 5 is a representation of some segments of pixels on a portion of object boundary, showing the lines fitting them.

As illustrated in FIG. 5, for each successive segment of boundary pixels 46, there is a line segment 48 that best fits all of the pixels 46 in the segment. A "least squares" best fit line step determines the line 48 and its angle, as well as the weight that should be accorded the angle for the line 48 for the segment. The less close the line 48 is to all the pixels 46 in the segment, the less weight the angle is afforded.

Preferably, the angle finder sequence 34 carries out these functions with a lookup table. That table can be constructed for segments of five boundary pixels 46 as four compass directions from the first pixel in the segment. Each compass direction can be represented by 3 bits (because there are eight compass directions, i.e., North, North-east, East, etc.). Thus, any sequence of five pixels can be encompassed in twelve bits. The twelve bits can be used as a lookup in a table containing in each entry an angle code and a weight code.

The inventors have observed that, in most cases, weight codes restricted to the value of 1 or 0 are preferred for more accuracy. That is, the angles of some segments will be counted in subsequent steps, and others will not. The weight code (of 1 or 0) is determined based on degree of fit of line using empirically determined thresholds.

The angle finder sequence 34 calculates the angle and weight for segments corresponding to each group of boundary pixels 46. It then forms a histogram of these angles based on their respective weights. In a preferred embodiment utilizing only weights of 0 and 1, each bin in the histogram represents the number of times a segment with an angle with a weight code of "1" was found. The first histogram contains bins covering the angles between 0 and 360 degrees In the preferred embodiment a "garbage" bin is added to collect angles given a weight of zero.

Figure 6:
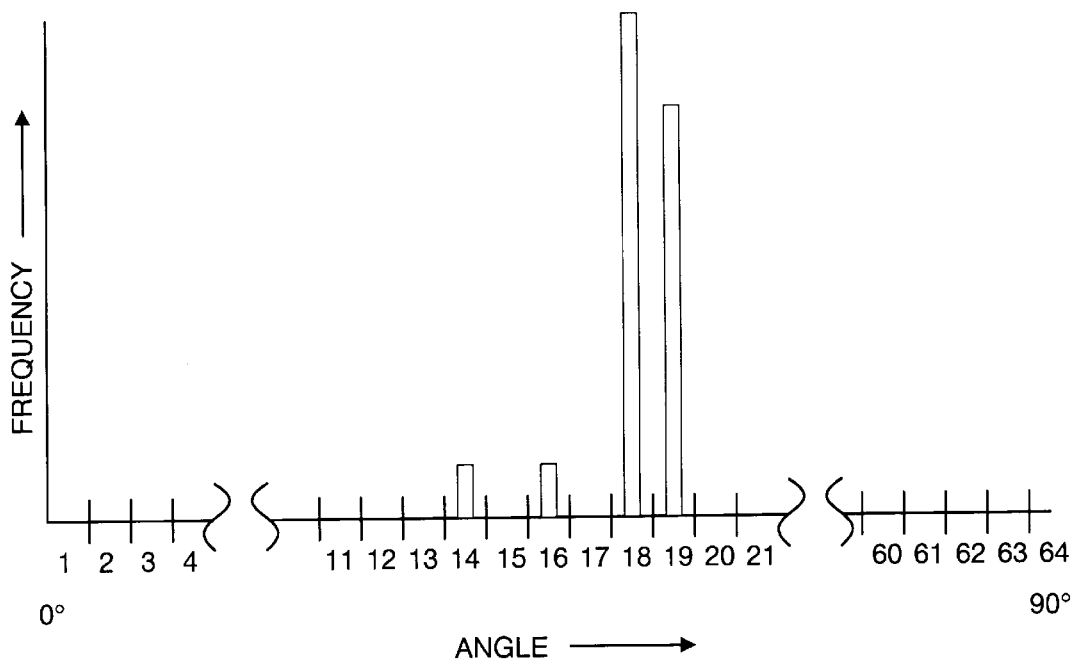
FIG. 6 is a representation of a histogram generated by a system constructed and operated according to the invention.

Next, the angle finder 38 forms a second, "normalized" histogram (see FIG. 6), containing bins covering the angles between 0 and 90 degrees. During normalization the contents of the bins from the first histogram are "rotated" by 90, −90 or 180 degrees to their equivalent first quadrant angle and then summed into that second histogram's bins. For example, the contents of the first histogram's bin containing the −130 degree angle are rotated by 180 degrees and are summed into the second histogram's 50 degrees bin. Preferably, these steps are combined to create a single normalized histogram from the original angles and weights.

The angle finder sequence 34 then selects the peak angle value from the second histogram, by first passing a triangle filter (an exemplary computer program listing of which is provided at the end of the Description of the Preferred Embodiment, and before the Claims) over the second histogram thereby providing a smoothed and peak-enhanced histogram, and then picking its peak output, and using that peak output as the center of a weighted window average, the window being centered on the peak output. To find an interpolated bin that represents the orientation angle more precisely that the bins in the first and second histograms, the weighted window average is computed, wherein the number of counts in each bin (of preferably the second histogram) included in the window is weighted by the number of the bin. Since the bin number is correlated with the object orientation angle, the interpolated bin number that results from performing the weighted average (the interpolated bin number typically including a fractional part) provides a more accurate determination of the object orientation angle than simply selecting a peak bin.

To check that a peak does indicate the angle, the angle finder sequence 34 looks for a second peak some distance away from the first. If there is one that is not significantly smaller than the first peak, the angle found is invalid. If the second peak is significantly smaller, than the angle associated with the first peak is valid. These values are chosen empirically.

A second preferred embodiment utilizes a boundary tracker that executes a sequence 32a that determines the object's boundary to sub-pixel accuracy. That embodiment also utilizes an angle finder that executes a sequence 34a that then finds an angle of the object 16 based on that boundary.

Certain assumptions are made when using this second embodiment of a preferred embodiment. One is that the intensity level of a pixel occurs at its center. The other is that the intensity gradient between the centers of adjacent pixels is linear.

The boundary tracker sequence 32a in the second preferred embodiment finds "boundary points," the fractional sub-pixel position of an object boundary that falls between a "hi" intensity pixel and a darker "lo" intensity pixel. Thus, boundary points are calculated at higher than pixel resolution. This forms a "grey-scale" boundary of finer resolution than the binary boundary found by the first embodiment.

The boundary tracker sequence 32a calculates the boundary points by interpolating grey-scale intensity values of the boundary pixels 46, i.e, the pixels found by the boundary tracker of the first embodiment.

Figure 7:
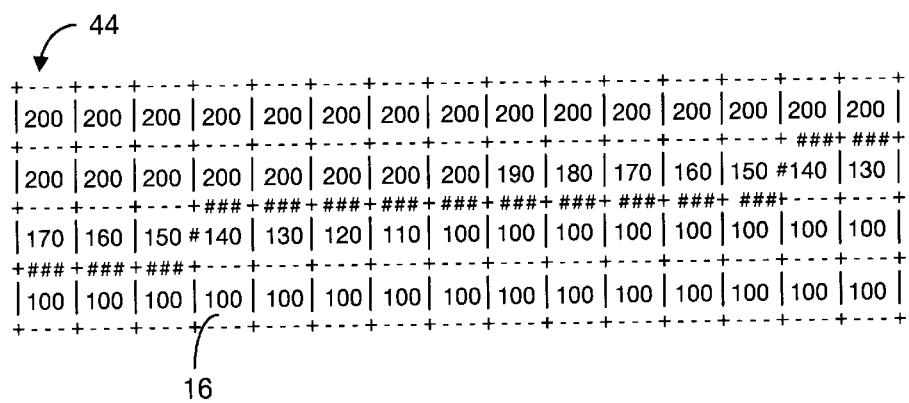
FIG. 7 is an idealized representation of a portion of a section of an object image.

An idealized portion of an image 44, including an edge of the object, is shown in FIG. 7. The high intensity of the brighter background region (or "B") is shown as having a value of 200. The lower intensity of the darker object (or "D") is shown as having a value of 100. The threshold intensity ("T") is calculated according to the formula, $T=(B+D)/2$, and is, therefore, 150. The binary boundary of the object 16 in FIG. 7 is shown by the "#" character. A pixel whose intensity is greater than or equal to T is considered to be outside the object 16.

The position of the grey level boundary is calculated as the fractional pixel distance from the "hi" pixel (outside the object) toward the "lo" pixel (inside the object). The fraction ranges from 0.0 (inclusive) to 1.0 (exclusive). It is computed using two intermediate quantities:

hi_diff=hi−T (note: hi_diff>=0)

lo_diff=T−lo (note: lo diff>0)

The computation is expressed as:

if (hi_diff>lo_diff)

fraction=1.0−lo_diff/(2*hi_diff);

else fraction=hi_diff/(2*lo_diff).

The fractions are preferably stored in a lookup table, indexed by the two 8 bit pixel difference values, so that the actual computation need not be made.

In a preferred embodiment, the angle finder sequence 34a can determine angles for segments of boundary points (instead of boundary pixels) based on the dx, dy between the head and tail of the successive segments. For efficiency, the actual computation of dx, dy is done by taking the integer dx, dy (which is constantly maintained as the segment moves) and correcting it based on sub-pixel interpolations for the head and tail pixels. The sub-pixel interpolations from the head of the segment are stored so that the interpolations do not need to be recomputed when the tail of the segment arrives at the same location.

In this embodiment, once the angles are determined as described above, weights of zero or one are assigned in the manner described with respect to the first embodiment. That is, the weights are determined from a look-up table, based on an index defined by the pixel sequence. Preferably, of course, the weight look-up is conducted prior to the angle determination. This enables the system to avoid determining angles for those sequences associated with zero weight.

In a third preferred embodiment, the boundary finder sequence 32a interpolates between neighboring pixels across the binary boundary to determine a sub-pixel boundary point. To find the sub-pixel location where T occurs, the sequence exercises one of two sequences depending upon whether the neighboring points, referred to as A and B, are even or odd neighbors. Even neighbors are defined as those for which the points lie North, East, South or West of one another. Odd neighbors are defined as those for which the points line Northeast, Northwest, Southwest, Northeast of one another.

Figure 8:
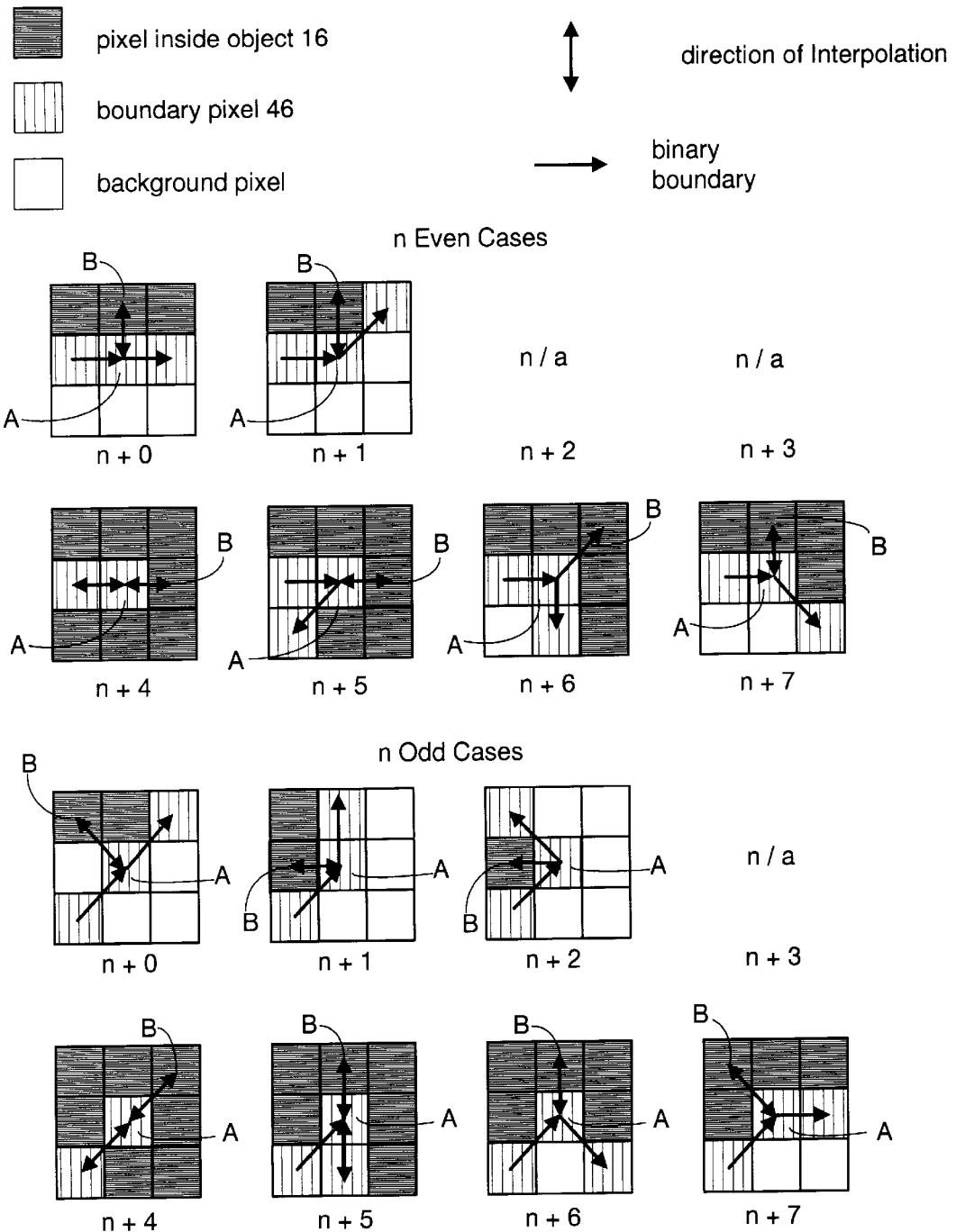
FIG. 8 is a representation of how boundary pixel neighbors are determined for boundary point calculations.

The sequence 32a determines the direction of interpolation (to determine the pixel neighbor across the boundary for each boundary pixel 46) by taking three adjacent boundary pixels 46 and using the direction between them to establish in which direction interpolation should occur. The examples in FIG. 8 illustrate some possible interpolations as a function of the two directions. The two directions are generalized and described as n+<dir>, where n is the first direction traveled and <dir> is the change in direction from the first direction to the second direction. Thus, FIG. 8 shows pixel A as the boundary pixel 46 and pixel B as the neighboring pixel inside the object 16 for a variety of combinations depending on the configuration of the boundary.

Where B is an even neighbor of boundary pixel A, i.e., B is a 0, 2, 4 or 6 neighbor of A, the interpolation distance calculation is as follows:

distance=(IA−T)/(IA−IB)

where, distance is the distance from boundary pixel A to the boundary point,

IA is the intensity level of boundary pixel A,

IB is the intensity level of pixel B, and

T is the threshold intensity level.

Note that the distance is always less than one.

Where B is an odd neighbor of A, i.e., B is a 1, 3, 5 or 7 neighbor of A, the interpolation distance calculation is as follows:

x distance=(IA−T)/(2*(IA−IC)), and y distance=(IA−T)/(2*(IA−ID)), where, n is the direction from A to B, IC is the intensity of A's n−i neighbor, and ID is the intensity of A's n+1 neighbor.

The angle finder 34a calculates the angle at every boundary point by calculating the angle of the line connecting the previous and next boundary points. This has the effect of smoothing the boundary slightly.

The angle at any given boundary point is found by the following equation:

$dx = \text{next}_x - \text{prev}_x$, $dy = \text{next}_y - \text{prev}_y$, and angle=atan2(dy,dx), where, ($\text{prev}_x$, $\text{prev}_y$) is the coordinate of the previous (or "tail") boundary point, and ($\text{next}_x$, $\text{next}_y$) is the coordinate of the next (or "head") boundary point.

The angle finder sequence 34a of the third embodiment calculates the vector at each boundary point and adds it (the dx, dy contribution of the current segment) to the appropriate bin of the first histogram (covering angles between 0 and 360 degrees). The second histogram (covering angles between 0 and 90 degrees) is constructed from the first histogram, as in the first embodiment. The contents of a bin are rotated by negating and/or swapping the dx and dy sums. Rotations of 180 degrees are accomplished by negating the dx and dy sums. Rotations of 90 degrees are accomplished by negating the dy sum and then swapping the dx and dy sums. Rotations of −90 degrees are accomplished by negating the dx sum and then swapping the dx and dy sums.

Thus, for the −130 degree case, a rotation of 180 degrees is achieved by negating the first histogram's −130 degree bin dx sum and adding it into the second histogram's 50 degree dx sum. The equivalent is done for the dy sum.

When the triangle filter is passed over the second histogram, it is applied to the square of the distance traveled at each bin angle, i.e., the dx sum is squared and added to the square of the dy sum. The peak output is thereby selected.

The angle finder sequence 34a calculates the angle of the object by adding the running dx sums of the peak-picked bin with some of the adjacent bins, as well as the dy sums, to arrive at an aggregate dx and an aggregate dy. The arctangent of dy/dx yields an angle between 0 and 90 degrees.

As a general rule, the binary boundary angle finder technique of the first embodiment is quicker. The grey scale boundary angle finder of the second and third embodiments are more accurate but slower. All three embodiments can be combined in one system. The system includes the step of deciding whether to use the output of the boundary pixels directly, to calculate angles and then form histogram, or to use the output of the boundary pixels by interpolating to find boundary points, and then calculate angles based on those boundary points before using the histograms.

```
/************************************************************
 *
 * CAF ANGLE HISTOGRAM
 *
 * CAFAH_SIZE_LOG_2
 * The number of bins in the histogram log 2.
 * CAFAH_TRIANGLE_FILTER_WIDTH_DEG
 *The triangle filter width expressed in degrees for peak picking
 *the histogram.
 * CAFAH_FINAL_ANGLE_SPREAD_DEG
 *The number of degrees about the histogram peak whose dy/dx
 *contribution should be included in determining the final angle.
 *
 * The above constants are the ONLY user adjustable constants.
 * All the other constants are derived from these.
 *
 * CAFAH_FINAL_ANGLE_SPREAD MUST be odd for symmetry.
 * CAFAH_TRIANGLE_FILTER_WIDTH MUST be odd for symmetry.
 ************************************************************/
#defineCAFAH_SIZE_LOG_2 9/* in bins */
#defineCAFAH_TRIANGLE_FILTER_WIDTH_DEG25/* in degrees */
defineCAFAH_FINAL_ANGLE_SPREAD_DEG25/* in degrees */ defineCAFAH_SIZE(1<<CAFAH_SIZE_LOG_2)/* in bins */
defineCAFAH_SIZE_MOD_90((CAFAH_SIZE)>>2)/* in bins */
#defineCAFAH_DEG_PER_BIN(360.0/(double)CAFAH_SIZE)
#defineCAFAH_TRIANGLE_FILTER_WIDTH\
(((CAFAH_TRIANGLE_FILTER_WIDTH_DEG<<
CAFAH_SIZE_LOG_2)/360)|0x01)/* in bins */
#defineCAFAH_FINAL_ANGLE_SPREAD\
(((CAFAH_FINAL_ANGLE_SPREAD_DEG<<
CAFAH_SIZE_LOG_2)/360)|0x01)/* in bins */ typedefstruct
{
csmb_coord_s8dx;
csmb_coord_s8dy;
c_Int32count;
} caf_angle_histogram;

static caf_angle_histogram caf_angle_hist[CAFAH_SIZE];
static c_Int32caf_angle_hist_folded[CAFAH_SIZE_MOD_90*2];
staticc_Int32bin_max_folded;/* bin # with max folded count*/ defineWRAP(n,mod)((n)&((mod)-1))

/************************************************************
 *
 * caf_angle_hist_peak_pick()
 *
 * Return the bin which represents the histogram peak.
 * Currently inplemented with a triangle filter.
 *
 ************************************************************/
c_Int32
caf_angle_hist_peak_pick()
{
register c_Int32i;
register c_Int32*h_p;
register c_Int32 *t_p;
register c_Int32 *m_p;
c_Int32count;
c_Int32delta;
c_Int32max_count;
c_Int32max_i;
c_Int32w;
c_Int32h;

/*
 * Sum bins that are 90 degrees apart.
 * Copy the folder histogram to fake a circular buffer
 * for the triangle filter.
 */
max_count = 0;
h_p = &caf_angle_hist_folded[0];
t_p = &caf_angle_hist_folded[CAFAH_SIZE_MOD_90];
for (i=0; i<CAFAH_SIZE_MOD_90; i++)
{
*h_p++ = *t_p++ = caf_angle_hist[i].count
+ caf_angle_hist[i+CAFAH_SIZE_MOD_90].count
+ caf_angle_hist[i+CAFAH_SIZE_MOD_90*2].count
+ caf_angle_hist[i+CAFAH_SIZE_MOD_90*3].count;
}

/*
 * Compute initial weighted count under filter
 * Compunt delta for 1st shift
 */
w = CAFAH_TRIANGLE_FILTER_WIDTH;
h = (w - 1) / 2;/* half width of filter */
count = (h + 1) * caf_angle_hist_folded[h];
t_p = &caf_angle_hist_folded[0];
h_p = &caf_angle_hist_folded[w-1];
for (i=0; i < h; i++, h_p--, t_p++)
count += (i+1) * (*h_p + *t_p);
delta = 0;
t_p = &caf_angle_hist_folded[0];
h_p = &caf_angle_hist_folded[w];
for (i=0; i < h+1; i++, h_p--, t_p++)
delta += -(*t_p) + *h_p;
max_count = count;
max_i = h;

/*
 * Run the filter looking for the maximum count and
 * the bin at which it occurs
 */
t_p = &caf_angle_hist_folded[0];
m_p = &caf_angle_hist_folded[h+1];
h_p = &caf_angle_hist_folded[w+1];
for (i=0; i < CAFAH_SIZE_MOD_90; i++, h_p++, m_p++, t_p++)
{
count += delta;
delta += (*t_p) - ((*m_p)<<1) + *h_p;
if (count > max_count)
{
max_count = count;
max_i = i + h + 1;
}
}
max_i = WRAP(max_i, CAFAH_SIZE_MOD_90);
bin_max_folded = max_i;
return(max_i);
} define segBins 64

/************************************************************\
 *
 * segmentAngle () -
 *
 * Calculate Angle from Segment Data.
 *
 * Compute a single angle from the histogram of angles. This function
 * runs a triangular filter over the histogram and computes the angle of
 * maximum response. The filter is of size <window> in units of
 * tan(theta). The entire histogram is 2.0 units wide: tan(-45) to
 * tan(+45). Note that the histogram must be considered a ring.
 *
 * The algorithm first finds the histogram bin at the center of the
 * filter when the weighted sum of all bins under the filter is a
```

-continued

```
* maximum. It then computes the center of gravity of the bins under
* a half width boxcar filter centered at this position.
*
\************************************************************/ double segmentAngle (seg, window)
segmentData *seg;
double window;
{
int i, h, maxMid;
int lead, mid, trail;
int ring[2 * segBins];
int sumWeight;
int dWeight;
int maxWeight, maxTan;
int w = cia__limit ((int)(window * segBins / 2.), 1, segBins);
double tanTheta;

cu_copy (seg->hist, ring, sizeof (seg->hist));
cu_copy (seg->hist, ring + segBins, sizeof (seg->hist));

if ((w & 0x1) == 0)/* Make # of bins in filter be odd */
w -= 1;

h = (w - 1) / 2;/* half width of filter */

/* Compute initial weighted sum under filter */
sumWeight = (h + 1) * ring[h];
for (lead = 0, trail = w-1; lead < h; lead++, trail--)
sumWeight += (lead+1) * (ring[lead] + ring[trail]);

/* Compute amount by which the weighted sum will change during 1st
shift */
dWeight = 0;
for (lead = 0, trail = w; lead < h+1; lead++, trail--)
dWeight += -ring[lead] + ring[trail];

maxWeight = sumWeight;
maxMid = h;

/* Compute maximum weighted sum, and the bin at which it occurs */
for (trail = 0, mid = h+1, lead = w+1; trail < segBins - 1;
++trail, ++mid, ++lead)

{
sumWeight += dWeight;
dWeight += ring[trail] - (ring[mid] << 1) + ring[lead];
if (sumWeight > maxWeight) maxWeight = sumWeight, maxMid = mid;
}

/* Compute center of gravity (COG) under 1/2 width boxcar */
maxTan = 0;
maxWeight = 0;
for (lead = maxMid-h/2, i = 0; i < (h | 0x1); i++, lead++)
{
maxTan += lead * ring[lead];
maxWeight += ring[lead];
} tanTheta = ((double) maxTan / maxWeight);/* Compute tan index
(COG) */
if (tanTheta > segBins) tanTheta -= segBins;
tanTheta = (2.0 * (tanTheta/segBins)) - 1.0;/* Compute actual tangent */
/*printf("Theta = %f\n",atan (tanTheta) * C__R2D); */
return (atan (tanTheta) * C__R2D);
}
```

The embodiments described above can be advantageously used to determine the angle of a rectilinear object in the image, but other characteristics of an object in an image may also be revealed by analyzing features associated with each boundary pixel or boundary point with the aid of a histogram. Further additions, modifications and substitutes for portions of the illustrated embodiments described above will occur to those skilled in the art and are considered to be with the scope of the invention, as set forth in the following claims.

We claim:

1. A method for finding the object orientation angle of a rectilinear object in an image data analysis system, comprising:

A. generating boundary coordinate signals representative of coordinates of a boundary of the object by traversing a boundary of said object image based on an intensity of selected successive points of said object image, said traversing beginning at a first point on said boundary, B. generating from said boundary coordinate signals a sequence of equal-length boundary-segment orientation angle signals representative of a sequence of equal-length boundary-segment orientation angles of at least respective selected equal-length boundary-segments of said boundary, the boundary coordinate signals representative of a corner of the rectilinear object being de-emphasized, C. generating a histogram of said equal-length boundary-segment orientation angle signals, and D. generating an object orientation angle signal representative of an angle corresponding to a selected peak in said histogram to provide said object orientation angle.

2. The method according to claim 1 including the step of finding said first point on said boundary by traversing said object image in a selected direction to identify a transition from object to background.

3. A method according to claim 1 wherein step B includes the step of:

generating signals representative of the degree-of-fit weight to be accorded each angle, and step C includes the step of:
weighting each said angle added to the histogram with its corresponding degree-of-fit weight.

4. A method according to claim 3 wherein said weight is 0 or 1.

5. The method of claim 1, wherein step (C) further includees the step of:

normalizing the boundary-segment orientation angle of each said selected segment by subtracting a multiple of 90° from each said boundary-segment orientation angle so that said boundary-segment orientation angle is non-negative and not greater than 90°.

6. The method according to claim 1 further including the step of:

peak-enhancing the histogram by performing a moving-window weighted average of said histogram.

7. A method according to claim 3 including

A. providing a look-up table that shows an angle and a weight corresponding to each successive segment of n points, and B. looking up said angle and said weight for each contour segment in said look-up table.

8. The method according to claim 5, wherein the step of generating said object orientation angle signal includes the steps of:

comparing a highest peak of the histogram to a next-highest peak within a predetermined distance from said highest peak; and generating a signal representative of error if said next-highest peak is not significantly lower than said highest peak.

9. A method according to claim 1, step A of claim 1 further including:

generating signals representative of sub-pixel coordinates interpolated for the coordinates of pairs of pixels across the boundary of said object, one of each said pixel pair being a pixel outside the object and the other of each said pair being inside the object.

10. A method according to claim 1, step B of claim 2 including the step of:

generating signals representative of an angle representing at least selected successive segments of n coordinates along the boundary of said object, where n is an integer, by calculating the difference in x and y coordinates between the coordinate at the head of the segment and the coordinate at the tail of the segment.

11. A machine vision apparatus for finding the object orientation angle of a rectilinear object in an image data analysis system, comprising:

boundary tracking means for generating boundary coordinate signals representative of coordinates of a boundary of the object by traversing a boundary of said object image based on an intensity of selected successive points of said object image, said traversing beginning at a first point on said boundary, and angle finding means, including:

equal-length boundary-segment angle means coupled to said boundary tracking means for generating from said boundary coordinate signals, a sequence of equal-length boundary-segment orientation angle signals representative of an orientation angle of at least selected equal-length boundary-segments of said boundary, the boundary coordinate signals representative of a corner of the rectilinear object being de-emphasized, histogram means coupled to said equal-length boundary-segment angle means for generating a histogram of said equal-length boundary-segment orientation in response to said sequence of equal-length boundary-segment orientation angle signals, and angle reporting means coupled to said histogram means for generating an object orientation angle signal representative of an angle corresponding to a selected peak in said histogram to provide said object orientation angle.

12. A method according to claim 11 wherein said angle finding means includes degree-of-fit weight means for generating signals representative of a degree-of-fit weight to be accorded each angle, and said histogram means includes means for weighting each said angle added to the histogram with its corresponding degree-of-fit weight.

13. Apparatus according to claim 12 wherein said angle weight means generates weight signals of 0 or 1.

14. The apparatus of claim 11, wherein said histogram means includes normalizing means for normalizing the boundary-segment orientation angle of each said selected segment so that said boundary-segment orientation angle is non-negative and not greater than 90°.

15. Apparatus according to claim 11 in which said angle reporting means includes a histogram peak enhancer that performs a moving-window weighted average of said histogram for generating a peak-enhanced histogram signal.

16. Apparatus according to claim 12 in which said segment angle means includes a look-up table that shows an angle and a weight corresponding to each successive segment of n points, and look-up means for looking up said angle and said weight for each contour segment in said look-up table.

17. Apparatus according to claim 14 in which said angle reporting means includes:

comparison means coupled to said histogram means for comparing a highest peak of the histogram to a next highest peak within a predetermined distance from said highest peak; and error signalling means for generating a signal representative of error is said next highest peak is not significantly lower than said highest peak.

18. Apparatus according to claim 11 wherein said boundary tracking means includes interpolating means for generating signals representative of sub-pixel coordinates interpolated from the coordinates of pairs of pixels across the boundary of said object, one of each said pixel pair being a pixel outside the object and the other of each said pixel pair being inside the object.

19. The method according to claim 11, wherein said coordinates are each calculated to sub-pixel resolution, so as to provide sub-pixel boundary tracking of said boundary of said object image.

20. The method according to claim 11, wherein said coordinates are each calculated to sub-pixel resolution, so as to provide sub-pixel boundary tracking of said boundary of said object image.

21. The apparatus according to claim 11 wherein said boundary tracking means includes means for finding said first point on said boundary by traversing said object image in a selected direction to identify a transition from object to background.

22. The method of claim 1, further including the step of:

after the step of generating a histogram, peak-enhancing said histogram using a moving-window weighted average based on a weighting mask to provide a peak-enhanced histogram signal.

23. The method of claim 22, wherein said weighting mask includes the vertex of a triangle.

24. The method according to claim 1 including the step of finding said first point on said boundary by traversing said object image in a selected direction to identify a transition from object to background.

25. The apparatus according to claim 11 wherein said boundary tracking means includes means for finding said first point on said boundary by traversing said object image in a selected direction to identify a transition from object to background.

26. Apparatus according to claim 11 wherein said segment angle means includes means for calculating the difference in x and y coordinates between the coordinate at the head of each said selected segment of said boundary and the coordinate at the tail of each said selected segment of said boundary.

27. The method according to claim 1, wherein said coordinates are each calculated to sub-pixel resolution, so as to provide sub-pixel boundary tracking of said boundary of said object image.

28. The method according to claim 1, wherein said coordinates are each calculated to sub-pixel resolution, so as to provide sub-pixel boundary tracking of said boundary of said object image.

* * * * *